UNITED STATES PATENT OFFICE.

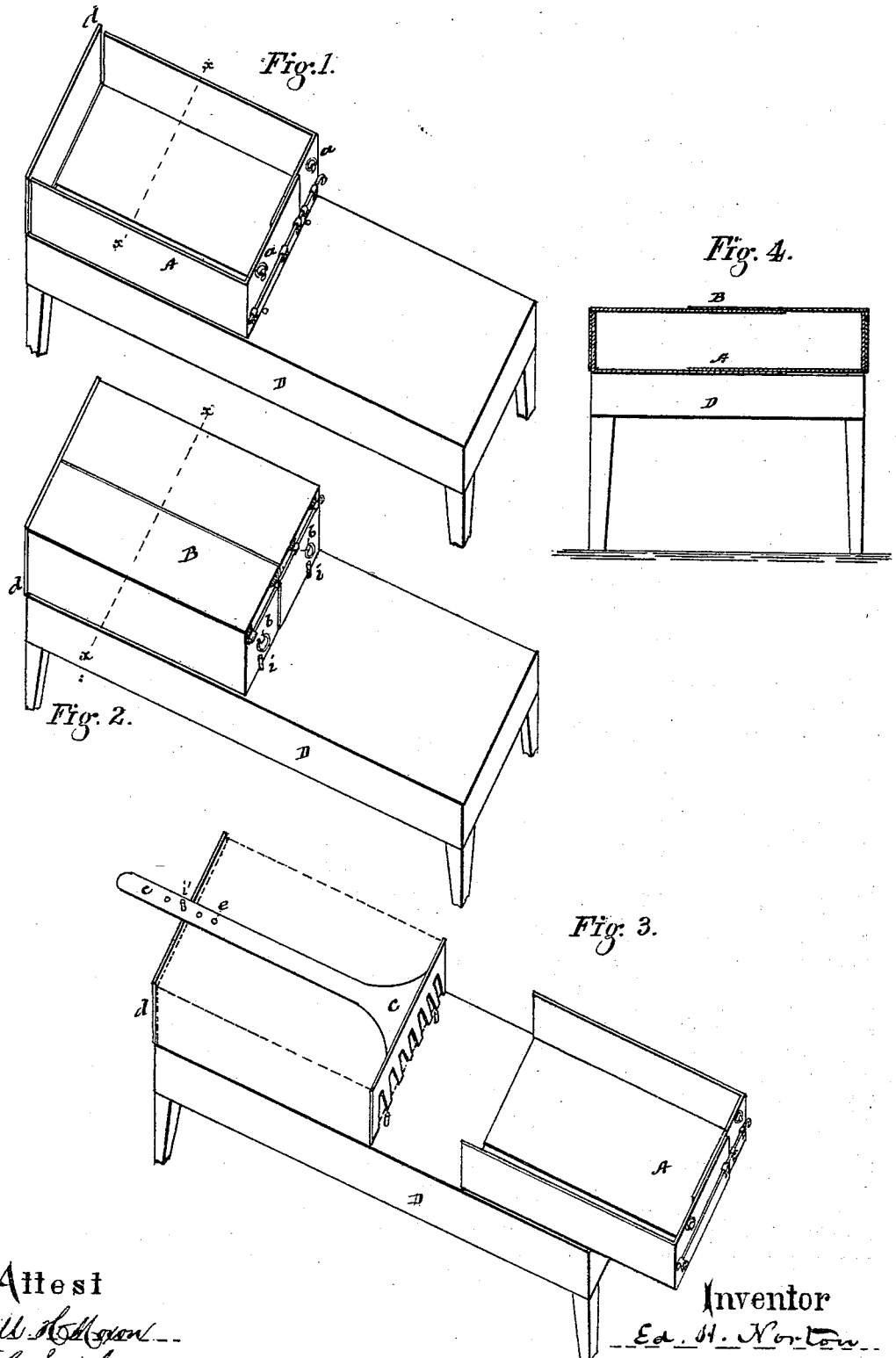

EDWARD H. NORTON, OF BRIDGEVILLE, DELAWARE.

IMPROVEMENT IN MACHINES FOR STUFFING MATTRESSES.

Specification forming part of Letters Patent No. 148,621, dated March 17, 1874; application filed February 6, 1874.

*To all whom it may concern:*

Be it known that I, EDWARD H. NORTON, of Bridgeville, Delaware, have invented a new and useful Improvement in Machinery for Stuffing Mattresses, Cushions, &c., of which the following is a full, clear, and exact description, reference being had to the accompanying drawings making part of this specification, in which—

Figure 1 is a perspective of my invention with the box in position ready for the stuffing material. Fig. 2 represents the box covered, after being filled. Fig. 3 shows the rake in position. Fig. 4 is a cross-section through $xx$ of Fig. 2.

The nature of my invention relates to that class of machines in which the stuffing is arranged in position before being placed within the ticking; and it consists of the combination and arrangement of parts, as hereinafter described.

To enable others skilled in the art to make and use my invention, I will describe the exact manner in which I have carried it out.

In the drawings, D represents a table, having a width something greater than the width of the mattress to be stuffed, and about twice its length. This table is provided at one end with the vertical wing $d$, standing higher than the upper corners of the box A, as shown in Fig. 1. For convenience, this wing may be hinged. The box A is constructed with only three sides and a bottom, being open on the top and at one end, as shown in Fig. 1. It is provided with the handles $a\ a$, for the purpose hereinafter explained, and is constructed in sections, as shown in Fig. 4, for the purpose of adjustment to suit different widths of mattresses, and so that they can be withdrawn separately from the sack; or it may be made otherwise without departing from the spirit of my invention. B is a cover fitting snugly over the box A, and also made in sections like the box, and having also an open end, and provided with the handles $b\ b$. C represents a rake, the head of which is provided with teeth, as shown in Fig. 3, and of a width to move freely within the box A, the handle $c$ being longer than the box, and provided with the holes $e$, to secure and hold the rake in position.

The operation of my invention is as follows: The box A is placed on the table D, with its open end against the wing $d$. The stuffing material is now placed in the box by hand, in any quantity desired, and the top B is placed over it, and the sack is drawn over the whole. The pins $i\ i$ are now inserted, as shown in Fig. 2, to hold back the box A while the sections of the top B are being withdrawn, by means of the handles $b\ b$, through the open end of the sack, being first lifted over the said pins. The pins $i\ i$ are removed, and the rake C is next inserted in the box A, and the handle $c$ passed outside and over the sack, and secured at the point $e$ on the wing of the table by the pin $i'$, or in any other convenient means. The rake securely holds the stuffing in position in the sack while the sections of the box A are being withdrawn by means of the handles $a\ a$. After this the rake is readily withdrawn, when the sack remains stuffed and ready for the needle.

I am aware that mattresses have been stuffed by machinery, and that boxes with covers have been used, over which the ticking or sack has been drawn; but these machines have been more or less costly and complicated, and they have failed to provide any sufficient means for holding the stuffing in the ticking while the box and cover are being removed therefrom. Taking out the box and cover in sections lessens the risk of disturbing the filling and labor in removing.

Having thus explained my invention, what I claim as new, and desire to secure by Letters Patent, is—

The box A, cover B, and rake C, in combination with the table D, provided with the wing $d$, substantially as and for the purpose set forth.

EDWARD H. NORTON.

Witnesses:
S. RAWLINS,
C. E. NORTON.